US012104052B2

(12) United States Patent
Schmidt et al.

(10) Patent No.: US 12,104,052 B2
(45) Date of Patent: Oct. 1, 2024

(54) CONSOLIDATED NONWOVEN

(71) Applicant: BASF SE, Ludwigshafen am Rhein (DE)

(72) Inventors: Henrik Schmidt, Ludwigshafen am Rhein (DE); Stefan Jesberger, Ludwigshafen am Rhein (DE); Thorsten Habeck, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 263 days.

(21) Appl. No.: 17/471,478

(22) Filed: Sep. 10, 2021

(65) Prior Publication Data

US 2022/0081548 A1 Mar. 17, 2022

(30) Foreign Application Priority Data

Sep. 11, 2020 (EP) ..................... 20195705

(51) Int. Cl.

| | |
|---|---|
| *C08L 33/26* | (2006.01) |
| *C08L 3/02* | (2006.01) |
| *C08L 25/14* | (2006.01) |
| *C08L 29/04* | (2006.01) |
| *C08L 33/08* | (2006.01) |
| *C08K 3/22* | (2006.01) |
| *E04D 1/20* | (2006.01) |
| *E04D 1/22* | (2006.01) |

(52) U.S. Cl.
CPC ................. *C08L 33/26* (2013.01); *C08L 3/02* (2013.01); *C08L 25/14* (2013.01); *C08L 29/04* (2013.01); *C08L 33/08* (2013.01); *C08K 2003/2206* (2013.01); *E04D 1/205* (2013.01); *E04D 1/22* (2013.01)

(58) Field of Classification Search
CPC .......... C08L 25/04; C08L 33/08; C08L 33/10; C08L 33/12; C08L 33/26; C08L 29/04; C08L 33/064; C08L 33/24; C08L 25/14; C08L 47/00; C08L 3/04; C09D 129/04
See application file for complete search history.

(56) References Cited

U.S. PATENT DOCUMENTS 5,830,241 A * 11/1998 Rohringer ............ G03C 1/8155
 8/919
2008/0142436 A1* 6/2008 Bothe ................... C09D 125/08
 428/479.6
2018/0086951 A1* 3/2018 Groh .................... D04H 1/4209
2018/0087222 A1* 3/2018 Niu ......................... D21H 19/20
2020/0095385 A1* 3/2020 Yoshihara ............... B32B 15/08
2020/0223978 A1* 7/2020 Vedage .................. C08G 59/22
2020/0324535 A1* 10/2020 Khorrami ................ C09D 1/00

FOREIGN PATENT DOCUMENTS

| | | |
|---|---|---|
| CA | 2036071 A1 | 8/1991 |
| DE | 4004915 A1 | 8/1991 |
| EP | 0114849 B1 | 8/1986 |
| EP | 1114849 A1 | 7/2001 |
| EP | 1846524 A1 | 10/2007 |
| EP | 2580257 A1 | 4/2013 |
| EP | 2987827 A1 | 2/2016 |
| EP | 3299514 A1 | 3/2018 |
| WO | 2006/082223 A1 | 8/2006 |
| WO | 2020/221605 A1 | 11/2020 |

* cited by examiner

*Primary Examiner* — Mark S Kaucher
(74) *Attorney, Agent, or Firm* — Faegre Drinker Biddle & Reath LLP

(57) ABSTRACT

The present invention relates to a consolidated nonwoven consolidated by treatment with an aqueous binder composition comprising:
 a polymer P,
 a polyvinyl alcohol,
 optional a starch compound S and
 optional at least one metal compound M selected from the group consisting of magnesium, calcium and zinc, in the form of an oxide, hydroxide, carbonate or bicarbonate,
wherein the polymer P is obtainable by free radical aqueous emulsion polymerization of a monomer mixture of
 75 to 99% by weight of one or more monomers a) selected from the group consisting of esters of acrylic and/or methacrylic acid with alkanols of 1 to 12 carbon atoms, aliphatic conjugated diene and aromatic vinyl compound
 1 to 25% by weight of one or more monomers b) selected from the group consisting of N-methylolacrylamide, N-methylolmethacrylamide, glycidyl methacrylate and carboxylic acid-functional ethylenically unsaturated monomers
 ≥0 to 15% by weight of one or more further ethylenically unsaturated monomer c) different from any of monomers a) and b)
wherein the amounts of monomers a) to c) sum to 100 wt %, the water-based binder composition, the process of for producing the consolidated nonwoven and its use as reinforcing insert for bituminized roofing membranes.

16 Claims, No Drawings

CONSOLIDATED NONWOVEN

CROSS-REFERENCE TO RELATED APPLICATIONS

This application claims priority to European Application No. 20195705.7, filed Sep. 11, 2020, which is incorporated herein by reference in its entirety.

DESCRIPTION

The present invention provides a consolidated nonwoven consolidated by treatment with a binder composition comprising thermally crosslinkable polymeric binder.

Bituminized roofing membranes are produced by coating a coating substrate with bitumen. The coating carriers used for this are mainly polyester spunbonded nonwovens, glass nonwovens, glass blended fabrics and polyester staple fiber nonwovens. Such nonwovens, e.g. nonwovens bonded with dispersion binder, should show only low elongation under the production conditions of bituminization. Furthermore, a rupture of the nonwoven due to the tensile load within the bituminizing process has to be avoided. During coating, the nonwoven is subjected to tensile stresses, additionally, temperatures in the range of 160 to 200° C. are required for bitumen coating. Under these conditions, the nonwoven stretching should be as low as possible, otherwise the webs will become longer in the direction of pulling and shorter in the transverse direction. The aim is therefore a good thermal dimensional stability behavior combined with high tensile strengths under room temperature as well as under elevated temperatures.

If the consolidated nonwoven can be stretched too much in the heat, tensions will be fixed when the roofing membranes are cooled and wound up. These tensions will be released again when the roofing membranes are reheated, e.g. when the seams are welded together or in strong sunlight, which can lead to cracks in the roofing membrane.

If the roofing membrane is too stiff and inflexible, fine cracks will occur which, in combination with moisture and cold, will destroy the waterproof effect of the membrane. For this reason, it is essential that at application temperature not only the bitumen but also the bonded nonwoven insert remains flexible.

Self-crosslinking aqueous polystyrene-butadiene dispersions for the consolidation of bituminizable roofing membranes and nonwovens are known from EP 114849, for example.

DE-A 40 04 915 discloses a binder composition, comprising a specific dispersion polymer whose dispersion polymer comprises between 3 and 45 wt % of at least one carboxyl-containing monomer in polymerized form, and a magnesium, calcium or zinc compound, in the form of an oxide, hydroxide, carbonate or bicarbonate. This binder composition is especially suitable for manufacturing of non-woven fabrics being used as the basis for bituminized roofing membranes.

Further EP-A- 2987827 describes a binder system based on polyacrylic acids combined with starch which might include polyvinyl alcohol as emulsifing agent.

EP 3299514 teaches a nonwoven consolidated with a binder system consisting of 20% by weight polyvinyl alcohol and 80% by weight starch. A nonwoven consolidated accordingly still tend to be brittle resulting in low room temperature strength values.

The object of the present invention was therefore to provide a novel binder composition whereby the disadvantages of prior art aqueous binder compositions can be overcome and whereby nonwovens consolidated with the water-based binder composition having improved longitudinal and transverse breaking strengths at room temperature and elevated temperatures as well as a good thermal dimensional stability performance.

The problem was solved by a consolidated nonwoven consolidated by treatment with an aqueous binder composition comprising:
  a polymer P,
  a polyvinyl alcohol,
  optional a starch compound S and
  optional at least one metal compound M selected from the group consisting of magnesium, calcium and zinc, in the form of an oxide, hydroxide, carbonate or bicarbonate,
wherein the polymer P is obtainable by free radical aqueous emulsion polymerization of a monomer mixture of
  75 to 99% by weight of one or more monomers a) selected from the group consisting of esters of acrylic and/or methacrylic acid with alkanols of 1 to 12 carbon atoms, aliphatic conjugated diene and aromatic vinyl compound,
  1 to 25% by weight of one or more monomers b) selected from the group consisting of N-methylolacrylamide, N-methylolmethacrylamide, glycidyl methacrylate and carboxylic acid-functional ethylenically unsaturated monomers,
  ≥0 to 15% by weight of one or more further ethylenically unsaturated monomer c) different from any of monomers a) and b),
wherein the amounts of monomers a) to c) sum to 100 wt %.

A further aspect of the present invention is the water-based binder composition comprising:
  a polymer P,
  a polyvinyl alcohol,
  optional a starch compound S,
  optional at least one metal compound M selected from the group consisting of magnesium, calcium and zinc, in the form of an oxide, hydroxide, carbonate or bicarbonate,
wherein the polymer P is obtainable by free radical aqueous emulsion polymerization of a monomer mixture of
  75 to 99% by weight of one or more monomers a) selected from the group consisting of esters of acrylic and/or methacrylic acid with alkanols of 1 to 12 carbon atoms, aliphatic conjugated diene and aromatic vinyl compound,
  1 to 25% by weight of one or more monomers b) selected from the group consisting of N-methylolacrylamide, N-methylolmethacrylamide, glycidyl methacrylate and carboxylic acid-functional ethylenically unsaturated monomers,
  ≥0 to 15% by weight of one or more further ethylenically unsaturated monomer c) different from any of monomers a) and b),
wherein the amounts of monomers a) to c) sum to 100 wt %.

The invention further relates to the process of for producing the consolidated nonwoven and its use as reinforcing insert for bituminized roofing membranes.

If in the context of this invention it is said that the sum of all monomers a) to c) equals 100% by weight, this does not mean that monomer c) must always be present, but rather that its proportion is only to be taken into account if present. The same applies to the composition of the water-based binder composition with its optional components starch compound S and metal compound M.

One essential constituent of the consolidated nonwoven is the polymer P obtainable by free radical aqueous emulsion polymerization of a monomer mixture of

- 75 to 99% by weight of one or more monomers a) selected from the group consisting of esters of acrylic and/or methacrylic acid with alkanols of 1 to 12 carbon atoms, aliphatic conjugated diene and aromatic vinyl compound,
- 1 to 25% by weight of one or more monomers b) selected from the group consisting of N-methylolacrylamide, N-methylolmethacrylamide, glycidyl methacrylate and carboxylic acid-functional ethylenically unsaturated monomers,
- 0 to 15% by weight of one or more further ethylenically unsaturated monomer c) different from any of monomers a) and b), wherein the amounts of monomers a) to c) sum to 100 wt %.

The polymer P is obtainable by free radical aqueous emulsion polymerization of a monomer mixture, which means it is water insoluble and is in the form of dispersed polymer particles.

As monomer a) there come into consideration esters of acrylic and/or methacrylic acid with alkanols of 1 to 12 carbon atoms for example ethyl acrylate, n-propyl acrylate, n-butyl acrylate, iso-butyl acrylate, sec-butyl acrylate, n-hexyl acrylate, 2-ethylhexyl acrylate, n-hexyl methacrylate and 2-ethylhexyl methacrylate. Preferred are methacrylate, methyl methacrylate, tert-butyl acrylate, tert-butyl methacrylate, ethyl methacrylate, isobutyl methacrylate, n-hexyl acrylate and cyclohexyl methacrylate.

Aliphatic conjugated diene monomers are for example 1,3-butadiene, isoprene and 2,3-dimethyl-1,3-butadiene. The preferred aliphatic conjugated diene is 1,3-butadiene.

Aromatic vinyl compound are more particularly derivatives of styrene or of α-methylstyrene in each of which the phenyl nuclei are optionally substituted by 1, 2 or 3 $C_1$ to $C_4$ alkyl groups, halogen, especially bromine or chlorine and/or methoxy groups. Preferred monomers are styrene, α-methylstyrene, o-vinyltoluene, p-vinyltoluene, p-acetoxystyrene, p-bromostyrene, p-tert-butylstyrene, o-chlorostyrene, m-chlorostyrene and p-chlorostyrene. Particulary preferred is styrene.

As monomers b) there come into consideration N-methylolacrylamide and N-methylol-methacrylamide (monomers b1) and/or carboxylic acid-functional ethylenically unsaturated monomer (monomers b2).

Preferred monomers b1) are N-methylolacrylamide and/or N-methylolmethacrylamide. The amount of these preferred monomers b1) polymerized into polymer P is ≥1 and ≤15 wt %, preferably ≥1 and ≤10 wt % and more preferably ≥1 and ≤5 wt %, based on the total amount of all monomers a), b) and c).

Advantageously, carboxylic acid functional ethylencially unsaturated monomers b2) are αa,β-monoethylenically unsaturated, especially $C_3$ to $C_6$ and preferably $C_3$ or $C_4$ mono- or dicarboxylic acids such as, for example acrylic acid, methacrylic acid, ethylacrylic acid, itaconic acid, allylacetic acid, crotonic acid, vinylacetic acid, fumaric acid, maleic acid, 2-methylmaleic acid. But the monomers b2) also comprise the anhydrides of appropriate α,β-monoethylenically unsaturated dicarboxylic acids, for example maleic anhydride or 2-methylmaleic anhydride.

The monomer b2) is preferably selected from the group comprising acrylic acid, methacrylic acid, crotonic acid, fumaric acid, maleic acid, maleic anhydride, 2-methylmaleic acid, itaconic acid and vinylsulfonic acid, of which acrylic acid, methacrylic acid, fumaric acid, maleic acid and/or vinylsulfonic acid are advantageously preferred. However, methacrylic acid is particularly preferred. It will be appreciated that the monomers b2) also comprise the fully or partially neutralized water-soluble salts, especially the alkali metal or ammonium salts, of the aforementioned acids. However, the non-neutralized monomers b2) are preferred.

As it comes to the carboxylic acid functional ethylencially unsaturated monomers, there are several preferred embodiments.

According to one preferred embodiment the amount of carboxylic acid functional ethylencially unsaturated monomers b) polymerized into polymer P is ≥1 and ≤25 wt %, preferably ≥7.5 and ≤22.5 wt % and more preferably ≥10 and ≤20 wt %, based on the total amount of all monomers.

According to another preferred embodiment the amount of carboxylic acid functional ethylencially unsaturated monomers b) polymerized into polymer P is ≥1 and ≤5 wt %, based on the total amount of all monomers.

As monomer c) different from any of monomers a) and b) further come into consideration esters of vinyl alcohol and a $C_1$ to $C_{10}$ monocarboxylic acid, $C_1$ to $C_{10}$ dialkyl maleate and/or $C_1$ to $C_{10}$ dialkyl fumarate, vinyl ethers of $C_3$ to $C_{10}$ alkanols, nitrile monomers, branched and unbranched $C_3$ to $C_{10}$ olefins. From this group it is advantageous for vinyl acetate, di-n-butyl maleate, di-n-butyl fumarate, tert-butyl vinyl ether or cyclohexyl vinyl ether, to be used as monomers c).

Suitable nitriles monomers c) are derived from the aforementioned α,β-monoethylenically unsaturated $C_3$ to $C_6$ and preferably $C_3$ or $C_4$, mono- or dicarboxylic acids, for example acrylonitrile, methacrylonitrile, maleonitrile and/or fumaronitrile, of which acrylonitrile and/or methacrylonitrile are particularly preferred.

As auxiliary monomers c) there come also into consideration all compounds which include at least two nonconjugated ethylenically unsaturated groups. Examples thereof are monomers including two vinyl radicals, monomers including two vinylidene radicals and also monomers including two alkenyl radicals. Of particular advantage here are the diesters of dihydric alcohols with α,β-monoethylenically unsaturated monocarboxylic acids, among which acrylic acid and methacrylic acid are preferred. Examples of such monomers including two nonconjugated ethylenically unsaturated double bonds are alkylene glycol diacrylates and alkylene glycol dimethacrylates, such as ethylene glycol diacrylate, 1,2-propylene glycol diacrylate, 1,3-propylene glycol diacrylate, 1,3-butylene glycol diacrylate, 1,4-butylene glycol diacrylate and ethylene glycol dimethacrylate, 1,2-propylene glycol dimethacrylate, 1,3-propylene glycol dimethacrylate, 1,3-butylene glycol dimethacrylate, 1,4-butylene glycol dimethacrylate, triesters of trihydric alcohols with α,β-monoethylenically unsaturated monocarboxylic acids, for example glycerol triacrylate, glycerol trimethacrylate, trimethylolpropane triacrylate, trimethylolpropane trimethacrylate, and also divinylbenzene, vinyl methacrylate, vinyl acrylate, allyl methacrylate, allyl acrylate, diallyl maleate, diallyl fumarate, methylenebisacrylamide, cyclopentadienyl acrylate, triallyl cyanurate or triallyl isocyanurate. 1,4-Butylene glycol diacrylate, allyl methacrylate and/or divinylbenzene are particularly preferred.

Such auxiliary monomers c) are crosslinkers for radical polymerization. The amount of these auxiliary monomers c) optionally polymerized into polymer P is ≥0 and ≤2.0 wt %, preferably ≥0 and ≤1.5 wt % and more preferably ≥0 and ≤1.0 wt %, based on the total amount of all monomers.

In one preferred embodiment, the aqueous binder composition comprises a polymer P, which is formed from 75 to 99% by weight of one or more monomers a) selected from the group consisting of esters of acrylic and/or methacrylic acid with alkanols of 1 to 12 carbon atoms, aliphatic conjugated diene and aromatic vinyl compound, preferably selected from the group consisting of esters of acrylic and/or methacrylic acid with alkanols of 1 to 12 carbon atoms, 1 to 15% by weight of N-methylolacrylamide and/or N-methylol-methacrylamide (monomer b1)

0 to 5% by weight of one or more carboxylic acid-functional ethylenically unsaturated monomer b2), 0 to 15% by weight of one or more further ethylenically unsaturated monomers c) different from any of monomers a) and b1) and b2), wherein the amounts of monomers a), b1), b2) if present, and c) if present, sum to 100 wt %, Preferably, the aqueous binder composition comprises a polymer P formed from 75 to 98% by weight, preferably 80 to 99% by weight of at least one monomer a) selected from the group consisting of styrene and ester of acrylic with alkanols of 1 to 4 carbon atoms, 1 to 10% by weight, preferably 1 to 5% by weight of N-methylolacrylamide and/or N-methylol-methacrylamide (monomer b1), 1 to 5% by weight of one or more carboxylic acid-functional ethylenically unsaturated monomer b2), 0 to 15% by weight of further ethylenically unsaturated monomers c) different from any of monomers a), b1) and b2), wherein the amounts of monomers a), b1), b2) and if present c) sum to 100 wt %.

Preferably, the aqueous binder composition comprises a polymer P formed from a) 75 to 99% by weight, preferably 80 to 99 by weight of styrene and butadiene, b) 1 to 10% by weight, preferably 1 to 5 by weight of N-methylolacrylamide and/or M-methyol-methacrylamide, c) ≥0 to 15% by weight of further ethylenically unsaturated monomers different from any of monomers a) and b), wherein the amounts of monomers a) to c) sum to 100 wt %.

In another preferred embodiment, the aqueous binder composition comprises a polymer P formed from 75 to 90 by weight of n-butyl acrylate and/or 2-ethylhexylacrylate (monomers a), 10 to 25% by weight of one or more carboxylic acid-functional ethylenically unsaturated monomers (monomer b)

0 to 10% by weight of vinylsulfonic acid, acrylonitrile and/ormethacrylonitrile (monomer c), in polymerized form, wherein the amounts of monomers a), b) and if present c) sum to 100 wt %, and the amount of the metal compound M is determined such that it is ≥0.1 and ≤1 mol based on one mol monomers b) in polymer P.

The preparation of polymers P will in principle be familiar to a person skilled in the art and is obtained for example through free-radical polymerization of monomers by the method emulsion polymerization.

Emulsion polymers as well as their preparation are generally known and described for example in application PCT/EP2020/060897, EP 1846524 and EP 1114849.

The polymers P used according to the present invention are obtained in the form of their agueous polymer dispersion often by co-using dispersing assistants which keep both the monomer droplets and the produced polymer particles in a state of dispersion in the aqueous medium and so ensure the stability of the aqueous polymer dispersion produced.

As dispersing assistants there come into consideration the protective colloids typically used for performance of free-radical aqueous emulsion polymerizations as well as emulsifiers. Such protective colloids and emulsifiers are described, for example, in the application PCT/EP2020/060897. It will be appreciated that mixtures of protective colloids and/or emulsifiers can also be used. Frequently, the dispersing agents used are exclusively emulsifiers whose relative molecular weights are typically below 1000, unlike protective colloids. They can be anionic, cationic or nonionic in nature. An overview of suitable emulsifiers is given in Houben-Weyl, Methoden der organischen Chemie, volume XIV/1, Makromolekulare Stoffe, Georg-Thieme-Verlag, Stuttgart, 1961, pages 192 to 208.

Preferably, however, it is anionic and/or nonionic emulsifiers and more preferably anionic emulsifiers that are used as dispersing assistants.

Polyvinyl alcohol is understood by a person skilled in the art to be hydrolysed polyvinyl acetates. Preferred are polyvinyl alcohol types with a degree of hydrolysis of >80%, preferably >98% and ≤100%. Particularly preferred are polyvinyl alcohols (PVA) with a degree of hydrolysis of 79% to 99.9%.

Preferred are polyvinyl alcohols with a weight-average molecular weight Mw ≥40,000 g/mol especially in the range of 50,000 to 120,000 g/mol.

A starch compound S is an optional constituent of the water-based binder composition. The term starch compound S comprises native starch, modified starch and degraded starch.

Starch is constructed of α-D-glucose units. The starches consist of the polysaccharides amylose (D-glucose units linked together α-1,4-glycosidically and amylopectin (D-glucose units linked together α-1,4- and additionally about 4% α-1,6-glycosidically). Naturally occurring starch typically comprises about 20 to 30 wt % of amylose and about 70 to 80 wt % of amylopectin. However, the ratio between amylose and amylopectin can vary as a result of breeding and according to plant species.

Useful starches include all native starches, for example starches from maize, wheat, oats, barley, rice, millet, potatoes, peas, tapioca, sorghum or sago. Also of interest are those natural starches that have a high amount of amylopectin content such as waxy maize starch and waxy potato starch. The amylopectin content of these starches is ≥90 wt %, often 95 and ≤100 wt %.

Modified starches are in general chemically modified starches. This is achieved essentially by polymer analogous reactions of these native starches in which the starch is treated with mono-, bi- or polyfunctional reagents or oxidizing agents. For example, modified starches produced by etherification or esterification can be used. Such products are well-known and available in the trade. They are produced for example by esterification of native starch with inorganic or organic acids, their anhydrides or chlorides. Of particular interest are phosphated and acetylated starches. The most common method for etherification of starches is the treatment of starch with organic halogen compounds, epoxides or sulfates in aqueous alkaline solution. Known starch ethers are alkyl ether, hydroxyalkyl ether, carboxyalkyl ether and allyl ether. Furthermore, the reaction products of starches with 2,3-epoxypropyltrimethylammonium chloride are suitable.

Also suitable are degraded starches. The degradation of the starches can be carried out enzymatically, oxidatively or hydrolytically by the action of acids or bases. The degradation of starch is well known and is described, for example, in EP 2580257. Degraded starches are commercially available. Particularly preferred are degraded native starches, especially native starches degraded to maltodextrin. Maltodextrins are classified by DE (dextrose equivalent) and have a DE between 3 and 20. The higher the DE value, the shorter the glucose chains.

According to a preferred embodiment, the starch compound S is a degraded starch. According to a preferred embodiment, the preparation of the polymer P is already carried out in the presence of a degraded starch, preferably a maltodextrin.

Other suitable starches are cationic modified starches, i.e. starch compounds containing amino or ammonium groups.

The molecular weights of the starches for use in accordance with the invention can vary over a wide range. Preferred starches have molecular weights Mw in the range between $2\times10^3$ and $1\times10^7$, particularly preferably between $5\times10^4$ and $5\times10^6$.

The metal compound M is selected from the group comprising magnesium, calcium and zinc, in the form of an oxide, hydroxide, carbonate or bicarbonate is a further essential constituent of the aqueous binder composition as well as the at least one polymer P and the at least one saccharide compound S.

In a preferred embodiment, calcium oxide [$CaO$], calcium hydroxide [$Ca(OH)_2$], calcium carbonate [$CaCO_3$] and/or calcium bicarbonate [$Ca(HCO_3)_2$] are used as an at least on metal compound M, especially in the form of an aqueous suspension or solution. In a more preferred embodiment calcium hydroxide, especially in the form of an aqueous suspension, is used as the at least one metal compound M.

In those embodiments, in which the metal compound is present, its amount of metal compounds M preferably is $\geq 0.1$ and $\leq 1$ mol, preferably $\geq 0.2$ and $\leq 0.7$ mol based on one mol monomers b) in polymer P.

In the context of this description, the term "nonwoven" should be understood in its broadest sense according to ISO 9092, 2001. Nonwovens are structures of textile materials, such as fibers, continuous filaments, or chopped yarns of any nature or origin, that have been formed into webs by any means, and bonded together by any means. The term "nonwoven" excludes the interlacing of yarns as in woven fabric, knotted fabric, laces, braided fabric of tufted fabric. The term "nonwoven" refers to the web used before treatment with the binder composition. The two terms "web" and "nonwoven" are therefore used side by side in this application. The webs treated according the invention encompasses dry-laid webs based on staple fibers as well as webs based on continuous filaments, where both web types are mechanically and/or thermally bonded.

Web forming materials are familiar to a person skilled in the art. They are for example natural fibers such as wood fibers and cellulose fibers, textile fibers, synthetic fibers, carbon fibers, glass fibers, ceramic fibers, mineral fibers or natural fibers such as jute, flax, hemp or sisal. Furthermore, cork chips or sand and also other organic or inorganic natural and/or synthetic fibrous compounds whose longest dimension is $\leq 10$ mm, preferably $\leq 5$ mm might be suitable.

According to one embodiment, glass fiber nonwovens used according to the invention can be consolidated by binders or even by mechanical measures, e.g., needling or hydrodynamic needling. The glass fibers may be filaments or continuous or cut glass fibers, wherein in the latter case, the length of the fibers is between 1 and 40 mm, preferably 4 to 20 mm. The mean diameter of the glass fibers is between 6 and 20 mm, preferably between 8 and 15 mm.

According to one embodiment, synthetic fibers are preferred which are selected from the group consisting of viscose, polyester, polyamide, polypropylene, polyethylene, polyacrylonitrile and polyvinyl chloride fibers. Preferred polyester fibers are polyethylene terephthalate fibers.

Within the nonwovens based on synthetic polymers, webs made from filaments formed from synthetic polymers, in particular spunbonded nonwoven and staple fiber nonwovens are preferred, especially spunbonded nonwovens of polyester fibers and staple fiber nonwovens based on polyester fibers.

Spunbonded nonwovens, so-called spunbond webs, which are produced by a random deposition of freshly melt-spun filaments, are preferred. They consist of continuous synthetic filaments made from melt-spinnable polymer materials. Preferably, the spunbond webs are made from melt-spinnable polyesters. The basis weight of the web used according to the invention made from fibers of synthetic products, in particular of synthetic polymers, is between 20 and 500 g/m2, preferably between 40 and 250 g/m2.

In addition to the aforementioned spunbond webs, so-called staple fiber webs are also possible based on the synthetic polymers mentioned above. The individual titers of the staple fibers in the staple fiber web are usually between 1 and 16 dtex, preferably 2 to 8 dtex. The staple fibers usually have a fiber length of 20-100 mm. The basis weight of the staple fiber webs is between 20 and 500 g/m2, preferably between 40 and 250 g/m2.

In a further embodiment, an additional reinforcement can be installed leading to higher stiffness and strength values of the consolidated nonwoven. For economic reasons, preferred reinforcements consist of glass multifilaments in the form of—essentially—parallel yarns. Usually, only one reinforcement is made in the longitudinal direction of the nonwoven by means of—essentially—parallel yarns. The reinforcing yarns can be used as such or in the form of their own textile fabric, for example as a woven fabric, mat, knitted fabric, crocheted fabric or as a non-woven fabric. Preference is given to reinforcements having mutually parallel reinforcing yarns, i.e., warped yarns, as well as mats or woven fabrics.

The process for producing a consolidated nonwoven from a fibrous web and the aforementioned aqueous binder composition advantageously comprises applying the aqueous binder composition of the present invention to a nonwoven, (normally by impregnation), and the resulting nonwoven is subjected to a thermal treatment step at a temperature $\geq 110°$ C., advantageously $\geq 130°$ C. and more advantageously $\geq 150°$ C., wherein the binder composition undergoes filming and curing. However, it is essential that a drying step has to be conducted after applying the aqueous binder composition of the present invention to the nonwoven and/or during the thermal treatment step.

It should be clear that the essential components of the aqueous binder composition, i.e., the aqueous dispersion of polymer P, and the polyvinyl alcohol and optional the starch compound S, can be mixed homogeneously before the applying to the fibrous web. But it is also possible to mix the components only immediately before the applying, for example using a static and/or dynamic mixing device.

Preferred is a consolidated nonwoven, wherein the binder composition comprises:
A) 1-99% by weight of polymer P,
B) 1-70% by weight of polyvinyl alcohol,
C) 0-50% by weight of the starch compound S,
D) 0-10% by weight of the metal compound M,
wherein the sum of the components A) to D) is 100% by weight.

Impregnating the nonwovens generally takes the form of the aqueous binder composition being applied uniformly to the surface of the fibrous web. The amount of water-based binder composition is chosen such that, per 100 g of fibrous web, ≥1 and ≤100 g, preferably ≥2 and ≤50 g and more preferably ≥5 and ≤30 g of binder (reckoned as summed overall amounts of polymer P, polyvinyl alcohol and starch compound S, on solids basis) are used. The actual method of impregnating the fibrous web is familiar to a person skilled in the art and is effected by drenching or spraying the fibrous web, preferably the mechanically and/or thermally bonded web, for example. Thereafter, the fibrous web is dried and cured/filmed in a manner familiar to a person skilled in the art. Within this step, a temperature >110° C., preferably >130 and <250° C. and more preferably >180° C. and <220° C.

The consolidated nonwoven obtainable by the process of the present invention have advantageous properties, more particularly improved breaking strengths at room temperature as well as at elevated temperatures and show also distinctly lower strains during thermal dimensional stability tests compared to nonwoven fabrics consolidated with state-of-the-art binder compositions.

The water-based binder compositions of the present invention are therefore particularly advantageous for production of consolidated nonwovens especially based on polyester and/or glass fiber, which in turn are particularly useful for production of bituminized roofing membranes.

The actual method of producing bituminized roofing membranes is familiar to a person skilled in the art and is more particularly effected by application of liquefied optionally modified bitumen to one and/or both of the sides of a polyester and/or glass fiber nonwoven consolidated with a binder composition of the present invention.

EXAMPLES

In the following all part and percentages are based on weight unless otherwise specified. The following materials were used:

Web 1: a needled spunbond web based on polyethylene terephthalate fibers having a basis weight of 150 g/m²

Web 2: a needled and a glass fiber reinforced staple fiber web based on polyethylene terephthalate fibers having a basis weight of 90 g/m²

Dispersion 1: a thermally crosslinkable copolymer of acrylic ester and styrene (together 96% by weight) and N-methylolmethacrylamide (4% by weight);

Dispersion 2: a thermally crosslinkable copolymer of styrene and butadiene (together 91% by weight) and N-methylolmethacrylamide (4% by weight);

Dispersion 3: a thermally crosslinkable copolymer of acrylic ester and unsaturated carboxylic acids (together 87.9% by weight) and calcium hydroxide (5.5% by weight);

Dispersion 4: a thermally crosslinkable copolymer of acrylic ester and styrene (together 85% by weight) and N-methylolmethacrylamide (5% by weight).

The weight of the monomers in percent is related to the total amount of monomers of the respective copolymer. All dispersions are anionically stabilized aqueous dispersion with a solid content in the range of 45-50% by weight.

Starch 1: a hydroxypropylated potato starch having an average molecular weight of 1,769,000 g/mol, dissolved in boiling water, 20% by weight;

Starch 2: a corn starch having an average molecular weight of 130,000 g/mol, dissolved in boiling water, 20% by weight Polyvinyl alcohol (PVOH) 1: fully hydrolyzed (according to data sheet 98.5-99.2 mol %) with an average molecular weight of 86,500 g/mol Polyvinyl alcohol 2: fully hydrolyzed (according to data sheet 98.5-99.2 mol %) with an average molecular weight of 29,500 g/mol Polyvinyl alcohol 3: fully hydrolyzed (according to data sheet 98.5-99.2 mol %) with an average molecular weight of 45,000 g/mol Polyvinyl alcohol 4: fully hydrolyzed (according to data sheet 98.5-99.2 mol %) with an average molecular weight of 57,000 g/mol Polyvinyl alcohol 5: fully hydrolyzed (according to data sheet 98.5-99.2 mol %) with an average molecular weight of 109,500 g/mol Each polyvinyl alcohol (PVOH) was dissolved in boiling water, 20% by weight.

Determination of Solid Contents (SC):

The determination of solids content is based on a gravimetric method. 1-2 g of the dispersion (initial weight) are weighed on an analysis balance into a tarred aluminum dish. The dish is stored for 1 hour at 120° C. in a circulating air oven until constant mass is reached. After cooling to room temperature (23° C.) the final weight is determined again (weight after drying).

The ratio of the "weight after drying" to the "initial weight" multiplied by 100% gives the solid content in per cent.

In the following composition, the proportions by weight are based on the dry mass of the binder composition, i.e., without water.

Binder composition A: a mixture of dispersion 1 and polyvinyl alcohol 1 with a ratio of 70/30 (solid/solid);

Binder composition B: a mixture of dispersion 2, starch 1 and polyvinyl alcohol 1 with a ratio of 50:30:20 (solid/solid/solid);

Binder composition C: a mixture of dispersion 2 and polyvinyl alcohol 1 with a ratio of 70/30 (solid/solid);

Binder composition D: a mixture of dispersion 3, starch 2, and polyvinyl alcohol 1 with a ratio of 50/30/20 (solid/solid/solid)

Comparative binder composition E: a mixture of dispersion 1 and a melamine formaldehyde resin with a solid content of 69% by weight), the mixture having a ratio (of 90/10 (solid/solid)

Comparative binder composition F: a mixture of dispersion 2 and starch 1 with a ratio of 70/30 (solid/solid)

Comparative binder composition G: a mixture of dispersion 4, starch 2, and a melamine formaldehyde resin with a solid content of 69% per weight, dispersion/starch/resin having a ratio of 39/35/26 (solid/solid/solid).

Comparative binder composition H: a mixture of starch 1 and polyvinyl alcohol 1 with a ratio of 80/20 (solid/solid), according EP 3299514

Performance testing

Production of Impregnating Liquors

The impregnating liquors were produced from the inventive binder composition A-D and also the comparative binder composition E and F by adjusting these compositions to a solids content of 13% by weight by diluting with deionized water.

Production of Consolidated Nonwovens (Fiber Webs)

The consolidated fiber webs were produced by saturating the respective raw web 1 or 2 with the respective impregnating liquors A-D and E or F in the longitudinal direction by means of a foulard via bath impregnation. The impregnated fiber webs obtained were subsequently dried and cured within a drum dryer from Mathis, the drying temperature and feed rate were set to 200° C. and 0.9 m/min, respectively. Thus, a drying/crosslinking time of 3 minutes was achieved. The solid content of 13% by weight of each impregnating liquor combined with an individual foulard pressure resulted in a solid binder amount of 20% after drying related to the basis weight of the webs.

inventive example 1 (IE1): web 2 was impregnated with binder composition A
  inventive example 2 (IE2): web 1 was impregnated with binder composition B
  inventive example 3 (IE3): web 1 was impregnated with binder composition C
  inventive example 4 (IE4): web 2 was impregnated with binder composition D
  inventive example 5 (IE5): web 1 was impregnated with binder composition A
  comparative example 1 (CE1): web 2 was impregnated with binder composition E
  comparative example 2 (CE2): web 1 was impregnated with binder composition F
  comparative example 3 (CE3): web 2 was impregnated with binder composition G
  comparative example 4 (CE4): web 1 was impregnated with binder composition H Determination of Breaking Strength and Breaking Strains in Machine and Cross-Machine Direction (Tensile Test)

Breaking strengths in machine direction (MD) and cross-machine direction (CD) were determined for fiber webs IE1 to IE5 and CE1 to CE3 at room temperature and at 180° C. in accordance with DIN EN 29073 using a breaking machine from Zwick (model Z005). To this end, 270×50 mm² strips were die-cut out of fiber webs IE1 to IE5 and CE1 to CE3 in the machine as well as cross-machine direction and clamped with a length of 200 mm into the pulling device.

For the tests at elevated temperatures a heating chamber was used. The individual specimen was clamped into the pulling device and the chamber was closed, after the temperature within the chamber stabilized at 180° C. the test started.

In each case, 5 separate measurements were carried out with a testing speed of 100 mm/min. By recording force and extension, breaking strengths in N/50 mm ($F_{max}$), as well as force-extension-curves were determined. In case of a glass yarn reinforced nonwoven the force level of the glass yarn rupture ($F_{glass}$) was additionally evaluated. Depending on the area weight of the fibrous web and the amount of reinforcing glass yarns either glass yarn rupture occurs prior to the total rupture of the remaining web or both effects happen simultaneously.

Regarding tensile tests higher breaking strengths imply a better material performance and therefore a better binder composition.

Determination of Thermal Dimensional Stability

The tests were carried out in accordance to DIN 18192. Specimens of 360×100 mm² were diecut out in machine direction. In the specimen center a field of 100×100 mm² was marked. Length and width values at 10 positions are determined. The temperature of the used heating chamber was set to 200° C. Within the chamber a laboratory stand was positioned. Clamping rails were fixed to both specimen ends. After opening the heating chamber, the specimen was connected with one clamping rail to the laboratory stand. The lower clamping rail was loaded with a constant mass and the chamber was closed, thus the loaded specimen was exposed to 200° C. for a time of 10 minutes. After that the specimen including the laboratory stand were removed from the chamber and the loaded specimen cooled down to ambient temperature for 5 minutes. Mass and clamped rails were removed and lengths and widths values of the marked field were determined and by means of the corresponding values prior to loading strains ($eps_{long}$, $eps_{trans}$) were calculated. The optimum values within the thermal dimensional stability tests would be zero, thus values of $eps_{long}$ and $ep_{strans}$ close to zero reveal a better thermal dimensional stability.

Within these tests web1 was loaded with 8 kg and web 2 with 6 kg.

TABLE 1

Results for tensile test and thermal dimensional stability of examples IE2, IE3, IE5 and CE2 (basis is web 1) with an area weight of the consolidated nonwoven of 186 g/m²

| example | Tensile test, RT MD $F_{max}$ | Tensile test, RT CD $F_{max}$ | Tensile test 180° C. MD $F_{max}$ | Tensile test 180° C. CD $F_{max}$ | *stability at 200° C. $eps_{long}$ [%] | *stability at 200° C. $eps_{trans}$ [%] |
|---|---|---|---|---|---|---|
| IE3 | 652 | 458 | 339 | 265 | 4.9 | −3.7 |
| IE2 | 689 | 489 | 355 | 286 | 5.4 | −4.6 |
| CE2 | 642 | 465 | 285 | 249 | 5.6 | −4.8 |
| IE5 | 686 | 478 | 332 | 253 | 5.4 | −4.7 |
| CE4 | 646 | 448 | 325 | 250 | 5.0 | −4.5 |

*thermal dimensional stability at 200° C.

TABLE 2

Results for tensile test and thermal dimensional stability of examples IE1, IE4 und CE1 und CE3 (basis is web 2) with an area weight of the consolidated nonwoven in the range from 110-130 g/m²

| example | Wt[2] | Tensile test, RT MD $F_{glass}$ | Tensile test, RT MD $F_{max}$ | Tensile test, RT CD $F_{max}$ | Tensile test 180° C. MD $F_{max}$ | Tensile test 180° C. CD $F_{max}$ | [1]stability at 200° C. $eps_{long}$ [%] | [1]stability at 200° C. $eps_{trans}$ [%] |
|---|---|---|---|---|---|---|---|---|
| IE1 | 126 | 295 | 271 | 229 | 118 | 116 | 1.0 | −0.6 |
| CE1 | 129 | 284 | 241 | 170 | 124 | 85 | 1.4 | −0.9 |
| IE4 | 109 | 340 | 223 | 269 | 146 | 148 | 0.01 | −0.05 |
| CE3 | 110 | 345 | 183 | 203 | 150 | 113 | 0.06 | −0.04 |

[1]thermal dimensional stability at 200° C.
[2]web weight of the consolidated nonwoven The results of the inventive examples reveal $F_{max}$ and—if existing—$F_{glass}$ values (in machine as well as cross-machine direction) than the comparative examples combined with lower $eps_{long}$ and $eps_{trans}$ values (improved thermal dimensional stability). Additionally, the recorded forceextension curves of the inventive binder compositions showed steeper curve progressions which means higher material stiffnesses.

Binder Compositions H-K with Different Polyvinyl Alcohol

In analogy to binder composition A, the binder compositions H to K were prepared as a mixture of 70 parts by weight dispersion 1 and 30 parts by weight of the respective polyvinyl alcohol (each calculated as solids), as shown in Table 3. The impregnating liquors were produced from the inventive binder composition H-K by adjusting these compositions to a solids content of 13% by weight by diluting with deionized water.

Fiber webs IE6 to IE8

Web 1 was impregnated, dried and hardened with the diluted binder compositions H to K thus obtained as described above.

TABLE 3

Results for tensile test and thermal dimensional stability of examples IE5 to IE9 (basis is web 1) with an area weight of the consolidated nonwoven of 186 g/m²

| Web | b.-comp. | PVA | MW of PVA [g/mol] | Tensile test, RT MD $F_{max}$ | Tensile test, RT CD $F_{max}$ | Tensile test 180° C. MD $F_{max}$ | Tensile test 180° C. CD $F_{max}$ | [1]stability at 200° C. $eps_{long}$ [%] | [1]stability at 200° C. $eps_{trans}$ [%] |
|---|---|---|---|---|---|---|---|---|---|
| IE5 | A | 1 | 86,500 | 686 | 478 | 332 | 253 | 5.4 | −4.7 |
| IE6 | H | 2 | 29,500 | 615 | 415 | 268 | 210 | 5.4 | −5.7 |
| IE7 | I | 3 | 45,000 | 659 | 471 | 297 | 238 | 5.3 | −5.1 |
| IE8 | J | 4 | 57,000 | 658 | 478 | 332 | 246 | 5.4 | −5.0 |
| IE9 | K | 5 | 109,500 | 661 | 475 | 332 | 253 | 5.3 | −4.0 |

[1]thermal dimensional stability at 200° C.

The invention claimed is:

1. A consolidated nonwoven consolidated by treatment with an aqueous binder composition comprising:
   1-99% by weight of a polymer P,
   1-70% by weight of a polyvinylalcohol,
   0-10% by weight of a starch compound S and
   0-10% by weight of at least one metal compound M selected from the group consisting of magnesium, calcium and zinc, in the form of an oxide, hydroxide, carbonate or bicarbonate,
   wherein the polymer P is obtained by free radical aqueous emulsion polymerization of a monomer mixture of
      75 to 99% by weight of one or more monomers a) selected from the group consisting of esters of one or more of acrylic and methacrylic acid with alkanols of 1 to 12 carbon atoms, aliphatic conjugated diene and aromatic vinyl compound,
      1 to 25% by weight of one or more monomers b) selected from the group consisting of N-methylolacrylamide, N-methylolmethacrylamide, glycidyl methacrylate and carboxylic acid-functional ethylenically unsaturated monomers, and
      ≥0 to 15% by weight of one or more further ethylenically unsaturated monomer c) different from any of monomers a) and b),
   wherein the amounts of monomers a) to c) sum to 100 wt %.

2. The consolidated nonwoven according to claim 1, wherein the polymer P is obtained by free radical aqueous emulsion polymerization of a monomer mixture of
   75 to 99% by weight of one or more monomers a) selected from the group consisting of esters of one or more of acrylic and methacrylic acid with alkanols of 1 to 12 carbon atoms, aliphatic conjugated diene and aromatic vinyl compound,
   1 to 15% by weight of one or more of N-methylolacrylamide and N-methylol-methacrylamide (monomer b1),
   0 to 5% by weight of one or more carboxylic acid-functional ethylenically unsaturated monomer b2), and
   0 to 15% by weight of one or more further ethylenically unsaturated monomers c) different from any of monomers a), b1) and b2)
   wherein the amounts of monomers a) to c) sum to 100 wt %.

3. The consolidated nonwoven according to claim 1, wherein the Polymer P is obtained by free radical aqueous emulsion polymerization of a monomer mixture of
- 75 to 98% by weight of at least one monomer a) selected from the group consisting of styrene and ester of acrylic with alkanols of 1 to 4 carbon atoms,
- 1 to 10% by weight of one or more of N-methylolacrylamide and N-methylol-methacrylamide (monomer b1),
- 1 to 5% by weight of one or more carboxylic acid-functional ethylenically unsaturated monomer b2), and
- 0 to 15% by weight of further ethylenically unsaturated monomers c) different from any of monomers a), b1) and b2),
- wherein the amounts of monomers a), b1), b2) and if present c) sum to 100 wt %.

4. A consolidated nonwoven consolidated by treatment with an aqueous binder composition comprising:
- a polymer P,
- a polyvinylalcohol,
- optionally a starch compound S and
- optionally at least one metal compound M selected from the group consisting of magnesium, calcium and zinc, in the form of an oxide, hydroxide, carbonate or bicarbonate,
- wherein the Polymer P is obtained by free radical aqueous emulsion polymerization of a monomer mixture of
  - a. 75 to 99% by weight of styrene and butadiene,
  - b. 1 to 10% by weight of one or more of N-methylolacrylamide and N-methylolmethacrylamide and
  - c. ≥0 to 15% by weight of further ethylenically unsaturated monomers different from any of monomers a) and b),
- wherein the amounts of monomers a) to c) sum to 100 wt %.

5. A consolidated nonwoven consolidated by treatment with an aqueous binder composition comprising:
- a polymer P,
- a polyvinylalcohol,
- optionally a starch compound S and
- optionally at least one metal compound M selected from the group consisting of magnesium, calcium and zinc, in the form of an oxide, hydroxide, carbonate or bicarbonate,
- wherein the polymer P is obtained by free radical aqueous emulsion polymerization of a monomer mixture of
  - 75 to 90% by weight of one or more of n-butyl acrylate and 2-ethylhexylacrylate (monomers a),
  - 10 to 25% by weight of one or more carboxylic acid-functional ethylenically unsaturated monomer (monomer b) and
  - 0 to 10% by weight of one or more of vinylsulfonic acid, acrylonitrile and methacrylonitrile (monomer c),
  - in polymerized form, wherein the amounts of monomers a) to c) sum to 100 wt % and wherein the amount of the metal compound M is determined such that it is ≥0.1 and ≤0.4 mol based on one mol monomers b) in polymer P.

6. The consolidated nonwoven according to claim 1, wherein the polyvinylalcohol has a degree of hydrolysis of ≥80%.

7. The consolidated nonwoven according to claim 1, wherein the polyvinylalcohol has a weight average molecular weight ≥40000 g/mol.

8. The consolidated nonwoven according to claim 1, wherein the wherein the starch compound S is a degraded starch.

9. The consolidated nonwoven according to claim 1, wherein the nonwoven comprises one or more of synthetic fibers, carbon fibers, glass fibers, ceramic fibers, mineral fibers and natural fibers.

10. The consolidated nonwoven according to claim 1, wherein the nonwoven comprises synthetic fibers selected from the group consisting of viscose, polyester, polyamide, polypropylene, polyethylene, polyacrylonitrile and polyvinyl chloride fibers.

11. The consolidated nonwoven according to claim 1, wherein nonwoven consists of a spunbond web or a staple fiber web, each with or without glass yarn reinforcement.

12. A process for producing a consolidated nonwoven according to claim 1, wherein an aqueous binder composition is applied to a nonwoven and the nonwoven thus obtained is subjected to a thermal treatment step at a temperature ≥110° C.

13. A method comprising providing the consolidated nonwoven according to claim 1, and incorporating the consolidated nonwoven as reinforcing insert for bituminized roofing membranes.

14. An aqueous binder composition comprising
- 1-99% by weight of a polymer P,
- 1-70% by weight of a polyvinyl alcohol,
- 0-50% by weight of a starch compound S and
- 0-10% by weight of at least one metal compound M selected from the group consisting of magnesium, calcium and zinc, in the form of an oxide, hydroxide, carbonate or bicarbonate,
- wherein the polymer P is obtainable by free radical aqueous emulsion polymerization of a monomer mixture of
  - 75 to 99% by weight of one or more monomers a) selected from the group consisting of esters of one or more of acrylic and methacrylic acid with alkanols of 1 to 12 carbon atoms, aliphatic conjugated diene and aromatic vinyl compound,
  - 1 to 25% by weight of one or more monomers b) selected from the group consisting of N-methylolacrylamide and N-methylolmethacrylamide, and
  - ≥0 to 15% by weight of one or more further ethylenically unsaturated monomer c) different from any of monomers a) and b)
  - wherein the amounts of monomers a) to c) sum to 100 wt %.

15. The consolidated nonwoven of claim 1, wherein the composition comprises at least one of:
- the starch compound S,
- and the at least one metal compound M.

16. The composition of claim 14, wherein the composition comprises at least one of:
- the starch compound S,
- and the at least one metal compound M.

* * * * *